United States Patent [19]

Nasyrov

[11] 3,728,438

[45] Apr. 17, 1973

[54] METHOD OF PRODUCING POTASSIUM SULPHATE FROM ALKALI METAL SULPHATES OR THEIR MIXTURES WITH CARBONATES

[76] Inventor: Gakif Zakirovich Nasyrov, prospekt Nauki, 12, kv. 49, Leningrad, U.S.S.R.

[22] Filed: Sept. 3, 1970

[21] Appl. No.: 69,447

[52] U.S. Cl. .................423/551, 423/184, 423/186, 423/118, 423/199
[51] Int. Cl. ..........................C01d 5/00, C01d 1/04
[58] Field of Search.............................23/121, 184; 423/551, 184, 186, 198, 199

[56] References Cited

UNITED STATES PATENTS

| | | | |
|---|---|---|---|
| 2,099,360 | 11/1937 | Yonemura et al. | 23/121 |
| 1,971,319 | 8/1934 | Wildman | 23/121 |
| 3,393,975 | 7/1968 | Mitchell et al. | 23/123 |

OTHER PUBLICATIONS

J. W. Mellor's "A Comprehensive Treatise on Inorganic and Theoretical Chemistry," Vol. 2, 1922 Ed., page 665, Longmans, Green & Co., New York.

*Primary Examiner*—Edward Stern
*Attorney*—Waters, Roditi, Schwartz & Nissen

[57] ABSTRACT

A method of producing potassium sulphate from alkali metal sulphates or their mixtures with carbonates wherein the sulphates or their mixtures with carbonates are treated with a solution of potassium hydroxide followed by isolating the potassium sulfate product. The present method is preferably carried out by employing a counterflow continuous flow scheme involving not less than two treatments of the sulphates with alkaline solutions, and after each alkaline treatment, the mother liquor, which is essentially a mixture of alkali hydroxides, is separated from the residue obtained, the first treatment of the sulphates being carried out with the mother liquor obtained in the course of the second alkali treatment and further each treatment of the sulphates being carried out with the mother liquors obtained in each subsequent treatment, the last treatment of the sulphates being carried out with a solution of potassium hydroxide, followed by isolating the potassium sulfate product. The present method finds application in the complex treatment of alunite, natural sulphates, in treating soda-sulphate wastes of alumina production, etc.

3 Claims, No Drawings

METHOD OF PRODUCING POTASSIUM SULPHATE FROM ALKALI METAL SULPHATES OR THEIR MIXTURES WITH CARBONATES

The present invention relates to a method of producing potassium sulphate from alkali metal sulphates or their mixtures with carbonates which finds application for processing alunite, soda-sulphate wastes of alumina production, natural sulphates (glaserite, berkeyite, mirabilite and others) and sulphate wastes of other industries.

Methods are known of producing potassium sulphate by treating sulphates with potassium chloride. For example, a method is known of producing potassium sulphate wherein a mixture of potassium and sodium sulphates obtained in complex processing of alunite is treated with a mother liquor obtained at a subsequent stage and containing a mixture of sodium and potassium sulphates and chlorides, this treatment being effected for a preliminary concentration of the starting mixture with potassium sulphate. The mixture thus obtained is allowed to settle and the solution is poured off and passed for further treatment to an evaporator and vacuum crystallizer for isolating potassium chlorides and sulphates, and after said salts are isolated, sodium chloride is separated from the remaining mother liquor by subsequent operations.

The concentrated thick mass after filtration is at the first step treated with a potassium chloride solution, then allowed to settle and the mother liquor is poured off and passed for the primary concentration of the starting raw material. The thickened mass is treated with water whereby the salt admixtures, such as KCl, NaCl and $Na_2SO_4$ are dissolved.

The mixture obtained is allowed to settle, the solution poured off and used for dissolving potassium chloride and the thickened mass is dried to give the final product.

The disadvantages of this known method lie in the fact that the process technology is complicated requiring large floor space and involving considerable power consumption and other operational expenses, and the target product is contaminated with Cl — ions which impairs its quality.

The principal object of the present invention is to provide a potassium sulfate product of high quality.

Another object of the present invention is to simplify the process technology.

A further object of the present invention is to increase the yield of the potassium sulfate.

These objects have been accomplished by provision such a method of producing potassium sulphate from sulphates or their mixtures with carbonates by treating them with potassium — containing compounds, wherein according to the invention, a solution of potassium hydroxide is used as the potassium — containing compounds.

Both a continuous and batch schemes may be employed when performing the process.

It is more advantageous to employ a continuous counterflow process scheme involving not less than two treatments of sulphates with alkali solutions wherein after each alkali treatment the mother liquor comprising a mixture of alkali hydroxides is separated from the residue obtained, the first treatment of sulphates being carried out with the mother liquor obtained in performing the next subsequent treatment with alkali and further each treatment of the sulphates being carried out with the mother liquors obtained in each subsequent treatment, and the last treatment of the sulphates is effected with a potassium hydroxide solution to isolate the final product $K_2SO_4$.

It is expedient to employ in the present process a solution of potassium hydroxide with a concentration of 300–500 g/l KOH and to carry out the process at a temperature of from 50° to 70° C, the period of time of each treatment of the sulphate with alkali solutions being 30–60 min.

The present method is accomplished in the following manner.

As the starting raw material use can be made of a mixture of sulphates obtained in the complex processing of alunite, or of a soda-sulphate mixture formed in producing alumina, or of natural sulphates.

The present method may be accomplished by employing a continuous or batch flow sheet. The batch process involves direct treatment of the alkali metal sulphates or their mixtures with carbonates with a solution containing potassium hydroxide followed by separating the potassium sulphate obtained.

It is preferred to employ a counterflow scheme in the process.

The starting salts are treated at a temperature of from 50° to 70° C for 30–60 minutes with the mother liquor obtained in performing the following treatment and said mother liquor being essentially a mixture of alkali hydroxides.

The so-obtained mixture of starting salts with the mother liquor is filtered or allowed to settle, the liquid of filtrate being used in alumina production and for other purposes. The residue is treated with a potassium hydroxide solution having a concentration of 300–500 g/l KOH at a temperature of 50°–70°C for 30–60 min. The mixture thus obtained is filtered. The mother liquor is used for the primary treatment of the starting salts. The remaining residue, being essentially potassium sulphate, is dried to give the final product. For a more complete recovery of potassium hydroxide the filtered off residue after the first treatment with the mother liquor can be repeatedly treated with mother liquors, the second and each treatment that follows being carried out with the mother liquors obtained in performing the third and/or every next subsequent treatment. The last treatment of the sulphate residue is carried out with a potassium hydroxide solution having a concentration from 300 to 500 g/l KOH.

The mixture obtained upon the last treatment is filtered, the mother liquor is used for the preceding treatment of the next portion of sulphate residue and the remaining residue is washed with water to give the target product potassium sulfate.

The present method makes it possible to simplify the technology of the process by eliminating the steps of evaporation and vacuum-crystallization and, in addition, to reduce power consumption (the process is effected at a temperature of from 50° to 70° C). Besides, the present method makes it possible to enhance the quality of the potassium sulfate target product as the product is not contaminated with Cl-ions the last feature inevitably occuring where potassium chloride is used.

It is highly expedient to employ the present method in the complex processing of alunite in which case along with simplifying the general technology of the process a high recovery of the valuable alunite component, viz. potassium sulphate, is achieved since in the treatment of alkali metal sulphates with a potassium hydroxide solution, according to this invention it is possible for the total sodium sulphate in the alunite in the form of sodium hydroxide to be used in alumina production to make up for alkali losses. Besides, as a result of using sodium hydroxide of alunite in the alumina production, the potassium accumulation limit in alkali solutions of the alumina production process is lowered, which results in providing greater solubility of sulphates therein (2–3 times as high as that in case the prior art method with the use of potassium chloride is employed). Thus, it becomes possible by employing alkali solutions of higher concentration in alumina production to at least halve the specific flows of solutions and power consumption required to heat and evaporate solutions in the production of alumina.

For a better understanding of the present invention by those skilled in the art the following examples of embodying the present method of producing potassium sulphate from alkali metal sulphates or their mixtures with carbonates are given by way of illustration.

Example 1.

1 ton of a mixture of sulphate obtained in complex processing of alunite and consisting of 57 wt. percent $K_2SO_4$ and 43 wt. percent $Na_2SO_4$ was taken as the starting raw material. The mixture was treated with the mother liquor obtained at the second step of alkaline treatment, which mother liquor being essentially a mixture of potassium and sodium hydroxides with a molar content of potassium hydroxide amounting 50 percent of the total alkalis in the solution and the concentration of alkalis being 230 g/l calculated as $Na_2O$.

The treatment was conducted at a temperature of 60° C for 60 minutes with vigorous stirring. After said treatment the residue was filtered off. The filtrate, being essentially a mixture of potassium and sodium hydroxides with a molar content of potassium hydroxide amounting 35 percent of the total alkalis and a total alkali concentration of 235 g/l calculated as $Na_2O$, used in alumina production or for other purposes. The remaining residue consisting of 66 wt. percent $K_2SO_4$ and 34 wt. percent $Na_2SO_4$ was treated with the mother liquor obtained at the third step of alkali treatment, said mother liquor being essentially a mixture of potassium and sodium hydroxides with a molar content of potassium hydroxide amounting 70 percent of the total alkalis in the solution and a total alkali concentration of 230 g/l calculated as $Na_2O$. The treatment was conducted at a temperature of 60° C for 60 minutes with vigorous stirring. The mixture was then filtered. The filtrate being essentially a mixture of potassium and sodium hydroxides with a molar content of potassium hydroxide amounting 50 percent of the total alkalis and a total alkali concentration of 230 g/l calculated as $Na_2O$ was passed for the primary treatment of the starting salt mixture. The remaining residue consisting of 79 wt. percent $K_2SO_4$ and 21 wt. percent $Na_2SO_4$ was treated with 1 m³ potassium hydroxide solution having a concentration of 400 g/l KOH.

The treatment was conducted at a temperature of 60° C for 60 minutes with vigorous stirring.

The mixture obtained was then filtered. The filtrate being essentially a solution of potassium and sodium hydroxides with a molar content of potassium hydroxide amounting 70 percent of the total alkalis and the total alkali concentration of 230 g/l calculated as $Na_2O$ was used for the treatment of the residue at the second step. The residue consisting of 97.2 wt. percent $K_2SO_4$ and 2.8 wt. percent $Na_2SO_4$ was washed with water by sprinking when filtering, then dried to give the desired product in a yield of 1040 kg.

Example 2.

1 ton of soda-sulphate waste obtained in alumina production and consisting of 23 wt. percent $Na_2CO_3$, 75 wt. percent $Na_2SO_4$ and 2 wt. percent NaOH was taken as the starting raw material.

The mixture was treated with the mother liquor obtained at the second step of alkaline treatement, said mother liquor being essentially a mixture of potassium and sodium hydroxides with potassium molar content amounting 37 percent of the total alkalis in the solution and the concentration of alkalis of 200 g/l calculated as $Na_2O$. This treatment was conducted at a temperature of 60° C for 60 minutes with vigorous stirring. After the treatment the residue was filtered off. The filtrate being essentially a mixture of potassium and sodium hydroxides with potassium hydroxide molar content amounting 15 percent of the total alkalis in the solution and the concentration of total alkalis of 200 g/l calculated as $Na_2O$ was passed for use in alumina production or for other purposes. The remaining residue consisting of 71 wt. percent $Na_2SO_4$, 28.5 wt. percent $K_2SO_4$ and 0.5 wt. percent $Na_2CO_3$ was treated with the mother liquor obtained at the third step of alkaline treatment, said mother liquor being essentially a mixture of potassium and sodium hydroxides with a potassium hydroxide molar content amounting 75 percent of the total alkalis in the solution and the concentration of total alkalis of 200 g/l calculated as $Na_2O$. This treatment was carried out at a temperature of 60° C for 60 minutes with vigorous stirring. The mixture was then filtered.

The filtrate being essentially a mixture of potassium and sodium hydroxides with a potassium hydroxide molar content amounting 37 percent of the total alkalis in the solution and the concentration of alkalis of 200 g/l calculated as $Na_2O$ was passed for the primary treatment of the starting salt mixture. The remaining residue consisting of 40.5 wt. percent $Na_2SO_4$ and 59.5 wt. percent $K_2SO_4$ was treated with 1 m³ potassium hydroxide solution having a concentration of 360 g/l KOH. The treatment was conducted at a temperature of 60° C for 60 minutes with vigorous stirring.

The mixture thus obtained was filtered. The filtrate being essentially a solution of potassium and sodium hydroxides with a potassium hydroxide molar content amounting 75 percent of total alkalis in the solution and the concentration of total alkalis of 200 g/l calculated as $Na_2O$ was used for treating the residue at the second step. The residue consisting of 98.3 wt. percent $K_2SO_4$ and 1.5 wt. percent $Na_2SO_4$ was washed with water by sprinkling when filtering and dried to give the final product in a yield of 850 kg.

What we claim is:

1. A method of producing potassium sulphate from material containing sulphates consisting essentially of alkali metal sulphates or their mixtures with carbonates comprising treating said material with a solution of potassium hydroxide, followed by isolating the potassium sulfate from the insoluble reaction product formed in said solution.

2. A method as claimed in claim 1, wherein the process is conducted by employing a counterflow process scheme involving not less than two treatments of sulphates with alkaline solutions and after each alkaline treatment the mother liquor, which is essentially a mixture of alkali metal hydroxides is separated from the residue obtained, the first treatment of the sulphates being carried out with the mother liquor obtained in the second alkaline treatment and further each treatment of the sulphates being carried out with the mother liquors obtained in each next subsequent treatment and the last treatment is carried out with a potassium hydroxide solution, followed by isolating the potassium sulfate from the reaction product which is insoluble in said potassium hydroxide solution.

3. A method as claimed in claim 2, wherein use is made of a potassium hydroxide solution with a concentration of 300–500 g/l KOH and the process is carried out at a temperature of from 50 to 70° C, each treatment of the sulphates with alkaline solutions lasting 30–60 min.

* * * * *